United States Patent
Yoshioka et al.

(10) Patent No.: US 9,553,294 B2
(45) Date of Patent: Jan. 24, 2017

(54) ELECTRIC STORAGE DEVICE, MANUFACTURING METHOD OF ELECTRIC STORAGE DEVICE, AND BUS BAR USED FOR ELECTRIC STORAGE DEVICE

(71) Applicant: LITHIUM ENERGY JAPAN, Kyoto-shi (JP)

(72) Inventors: Toshiki Yoshioka, Ritto (JP); Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 13/714,306

(22) Filed: Dec. 13, 2012

(65) Prior Publication Data

US 2013/0157113 A1    Jun. 20, 2013

(30) Foreign Application Priority Data

Dec. 16, 2011 (JP) ................. 2011-276250
Dec. 16, 2011 (JP) ................. 2011-276267
Nov. 26, 2012 (JP) ................. 2012-257525

(51) Int. Cl.

| | | |
|---|---|---|
| *H01M 2/20* | (2006.01) | |
| *B23K 26/22* | (2006.01) | |
| *H02G 5/00* | (2006.01) | |
| *H01G 11/10* | (2013.01) | |
| *H01G 11/74* | (2013.01) | |
| *H01G 11/82* | (2013.01) | |

(52) U.S. Cl.
CPC .............. *H01M 2/202* (2013.01); *B23K 26/22* (2013.01); *H01G 11/10* (2013.01); *H01G 11/74* (2013.01); *H01G 11/82* (2013.01); *H02G 5/00* (2013.01); *Y02E 60/13* (2013.01)

(58) Field of Classification Search
CPC ......... H01M 2/202; H01M 2/22; B23K 26/22; H02G 5/00; H02G 11/10; H02G 11/74; H02G 11/82
USPC ........................................ 429/158
See application file for complete search history.

(56) References Cited

U.S. PATENT DOCUMENTS

| | | |
|---|---|---|
| 2005/0079408 A1 | 4/2005 | Hirano |
| 2006/0193685 A1* | 8/2006 | Scotton et al. ............... 403/321 |
| 2009/0123830 A1* | 5/2009 | Kato et al. .................... 429/160 |
| 2010/0173178 A1* | 7/2010 | Kim et al. ........................ 429/1 |
| 2010/0173189 A1 | 7/2010 | Suzuki |
| 2013/0157113 A1 | 6/2013 | Yoshioka et al. |

FOREIGN PATENT DOCUMENTS

| | | |
|---|---|---|
| JP | H 01-179357 U | 12/1989 |
| JP | 2003-162993 A | 6/2003 |
| JP | 2004-127554 A | 4/2004 |
| JP | 2006-261083 A | 9/2006 |

(Continued)

OTHER PUBLICATIONS

Machine translation of JP 2004-127554 A, obtained Jan. 7, 2016.*

*Primary Examiner* — Nicholas P D'Aniello
(74) *Attorney, Agent, or Firm* — McGinn IP Law Group, PLLC.

(57) ABSTRACT

An electric storage device includes: electric storage elements including external terminals; and bus bars connected to the external terminals, wherein the bus bars include thin-walled portions, and the thin-walled portions and the external terminals are welded together.

13 Claims, 11 Drawing Sheets

(56) References Cited

FOREIGN PATENT DOCUMENTS

| | | |
|---|---|---|
| JP | 2007-194036 A | 8/2007 |
| JP | 2008-270033 A | 11/2008 |
| JP | 2009-087735 A | 4/2009 |
| JP | 2009-231145 A | 10/2009 |
| JP | 2009-245730 A | 10/2009 |
| JP | 2010-160931 A | 7/2010 |
| JP | 2010-212155 A | 9/2010 |
| JP | 2010/212155 A | 9/2010 |
| JP | 2012-043714 A | 3/2012 |
| JP | 2012-089254 A | 5/2012 |
| JP | 2013-127863 A | 6/2013 |

* cited by examiner

ELECTRIC STORAGE DEVICE, MANUFACTURING METHOD OF ELECTRIC STORAGE DEVICE, AND BUS BAR USED FOR ELECTRIC STORAGE DEVICE

BACKGROUND OF THE INVENTION

1. Field of the Invention

The present invention relates to an electric storage device, which includes an electric storage element having an external terminal and a bus bar connected to the external terminal, and a manufacturing method of the electric storage device. The present invention also relates to a bus bar to be connected to the external terminal of the electric storage element having the external terminal.

2. Description of the Related Art

In recent years, an electric storage element such as a battery (a lithium ion battery, a nickel-metal hydride battery, and the like) and a capacitor (an electric double layer capacitor and the like) which can be charged and discharged is employed as a power source of a vehicle (an automobile, a motorcycle, and the like) or various devices (a personal digital assistance, a notebook computer, and the like).

When high-volume electric power is required, an electric storage device including a plurality of electric storage elements and bus bars for electrically connecting the plurality of electric storage elements (see paragraph 0025 in JP-A-2010-160931) is employed as a power source.

Each of the electric storage elements includes a power generating element, a case for housing the power generating element, and external terminals disposed outside the case. The external terminals are electrically connected to the power generating element by shaft-shaped connecting bodies formed integrally with or separately from the external terminals. The electric storage element has gaskets disposed along an inner face and an outer face of the case. In this type of electric storage element, the connecting bodies pass through the case and the gaskets to electrically connect the power generating element in the case and the external terminals outside the case. The gaskets seal the holes which are formed in the case and through which the connecting bodies pass. Thus, an inside of the case is maintained airtight and liquid-tight.

There are various types of bus bars. An example of bus bars is welded to the external terminal(s) of the electric storage element(s). The bus bar has a main body portion and (a) connection portion(s) and is connected to the external terminal(s) through the connection portion(s).

More specifically, the bus bar is formed by a metal plate member having a substantially uniform thickness. The bus bar has the connection portion at least at one of its end portions. In other words, the bus bar having the main body portion and the connection portion(s) may have the connection portion connected to one end of the main body portion or may have the connection portions connected to both ends of the main body portion. The bus bar having the connection portion connected to the one end of the main body portion connects the external terminal of the electric storage element and an external electric load. The bus bar having the connection portions connected to the both ends of the main body portion connect external terminals of two electric storage elements.

In any case, the connection portion(s) is/are placed on (an) upper face(s) of the external terminal(s) of the electric storage element(s), and the connection portion(s) and the external terminal(s) (upper face(s)) are welded together. Thus, the bus bar is mechanically and electrically connected to the external terminal(s) of the electric storage element(s).

When the bus bar (connection portion(s)) and the external terminal(s) are welded together, a large amount of heat for melting the entire thickness of the bus bar is required. Therefore, in the conventional electric storage device, the gaskets may be softened or melted when the bus bar is welded. As a result, the gaskets cannot sufficiently seal the case, and the inside of the case cannot be maintained airtight and liquid-tight. Each of the external terminals is connected to the power generating element with a connecting conductor interposed therebetween. Therefore, the heat in welding the bus bar may be transferred to the inside of the case (e.g., to the power generating element or the like) through the external terminal. Therefore, the power generating element or the like in the case may be affected by the heat and its performance may deteriorate.

SUMMARY OF THE INVENTION

An aspect of the present invention provides an electric storage device in which deterioration of quality of an electric storage element due to the influence of the heat in welding of the bus bar to an external terminal of an electric storage element can be suppressed and a manufacturing method of the electric storage device.

Another aspect of the present invention provides a bus bar which can suppress deterioration of quality of the electric storage element due to the influence of the heat in welding to the external terminal of the electric storage element.

An electric storage device according to an aspect of the present invention includes: an electric storage element including an external terminal; and a bus bar connected to the external terminal, wherein the bus bar includes a thin-walled portion, and the thin-walled portion and the external terminal are welded together.

With this structure, the thin-walled portion of the bus bar and the external terminal of the electric storage element are welded together. Thus, it is possible to reduce output energy required for the welding as compared with a case in which the thin-walled portion is not provided. As a result, it is possible to prevent damage to a periphery of the external terminal of the electric storage element and an inside of the electric storage element due to influence of heat in the welding.

According to an example of the present invention, the electric storage device may include at least the two electric storage elements, and the thin-walled portions may be provided to at least two portions and welded to the external terminals of the two electric storage elements.

With this structure, because the thin-walled portion at the one portion is connected to the external terminal of the one electric storage element and the thin-walled portion at the other portion is connected to the external terminal of the other electric storage element, the bus bar connects the external terminals of the two electric storage elements. As a result, the two electric storage elements electrically form one electric storage element.

According to another example of the present invention, the thin-walled portion may be formed at least at a portion of the bus bar in contact with the external terminal.

With this structure, the thin-walled portion of the bus bar and the external terminal are welded together. Thus, it is possible to reduce the output energy required for the welding as compared with the case in which the thin-walled portion is not provided. As a result, it is possible to prevent the damage to the periphery of the external terminal of the electric storage element and the inside of the electric storage element due to the influence of the heat in the welding.

According to another example of the present invention, the thin-walled portion may be formed along an outer edge of the bus bar.

With this structure, the thin-walled portion is formed along the outer edge of the bus bar. Therefore, arbitrarily spots of the thin-walled portion may be welded or the thin-walled portion may be welded continuously along its longitudinal direction in order to increase weld strength. Thus, it is possible to freely select various forms of welding.

In this case, the outer edge of the bus bar may be in a shape without discrete portions.

With this structure, because the outer edge of the thin-walled portion is in the shape without discrete portions, the outer edge of the thin-walled portion does not have a corner portion. In welding at least a part of the outer edge of the thin-walled portion and the external terminal along the outer edge, if there is a corner portion, welding speed drops there and homogeneity of a welded portion is impaired. However, if there is no corner portion, the welding can be carried out continuously at a constant speed and therefore it is possible to form a homogenous welded portion of a certain length.

According to yet another example of the present invention, the thin-walled portion may be formed at a central portion of the bus bar.

With this structure, the thin-walled portion is formed at the central portion of the bus bar. Therefore, arbitrarily spots of the thin-walled portion may be welded or the thin-walled portion may be welded continuously along its longitudinal direction in order to increase the weld strength. In this manner, it is possible to freely select various forms of welding.

In this case, an outer edge of the thin-walled portion may be in a closed shape without discrete portions.

With this structure, because the outer edge of the thin-walled portion is in the closed shape without discrete portions, the outer edge of the thin-walled portion does not have a corner portion. In welding at least a part of the outer edge of the thin-walled portion and the external terminal along the outer edge, if there is a corner portion, the welding speed drops there and homogeneity of a welded portion is impaired. However, if there is no corner portion, the welding can be carried out continuously at a constant speed and therefore it is possible to form a homogenous welded portion of a certain length.

According to another example of the present invention, the bus bar may include a main body portion and a connection portion continuous with the main body portion and to be connected to the external terminal, and the thin-walled portion may be formed at the connection portion.

With this structure, the thin-walled portion is formed at the connection portion. Therefore, arbitrarily spots of the thin-walled portion may be welded or the thin-walled portion may be welded continuously along its longitudinal direction in order to increase the weld strength. Thus, it is possible to freely select various forms of welding.

In this case, the connection portion may have a smaller width than the main body portion.

With this structure, in the bus bar, the connection portion has the smaller width than the main body portion. Therefore, it is possible to reduce a welding range as compared with a case in which the width of the connection portion is not smaller than that of the main body portion. If the welding range can be reduced, the output energy required for the welding can be further reduced. As a result, it is possible to prevent the damage to the periphery of the external terminal of the electric storage element and the inside of the electric storage element due to the influence of the heat in the welding. Because the width of the main body portion is not small, it is possible to obtain an appropriate current capacity with the bus bar as a whole.

In this case, the electric storage device may include at least the two electric storage elements, and a pair of the connection portions may be provided to both ends of the main body portion to connect the external terminals of the two electric storage elements.

With this structure, in the bus bar, because the one connection portion is connected to the external terminal of the one electric storage element and the other connection portion is connected to the external terminal of the other electric storage element, the bus bar connects the external terminals of the two electric storage elements. As a result, the two electric storage elements electrically form one electric storage element.

In this case, each of the electric storage elements may include a case and may be in a shape of a flat prism, one face of the case on which the external terminal is disposed may be in a rectangular shape, at least the two electric storage elements may be disposed so that the one faces are arranged in a longitudinal direction, the main body portion may be formed to correspond to a width of the one face, and the connection portions may be formed to correspond to a width of the external terminal which is smaller than the width of the one face.

With this structure, when the at least two electric storage elements are disposed so that the one faces on which the external terminals are disposed are arranged in the longitudinal direction and the bus bar connects the external terminals of the two electric storage elements, the main body portion is formed to correspond to the width of the one face, and the connection portions are formed to correspond to the width of the external terminal which is smaller than the width of the one face. As a result, it is possible to alleviate a constraint on a layout or a constraint on a disposition space in placing the connection portions on the external terminals. Because the width of the main body portion is not small, it is possible to obtain the appropriate current capacity with the bus bar as a whole.

Alternatively, each of the electric storage elements may include a case and may be in a shape of a flat prism, one face of the case on which the external terminal is disposed may be in a rectangular shape, the plurality of electric storage elements may be disposed in lines and rows so that the one faces may be arranged in a longitudinal direction and a short-side direction, the main body portion of the bus bar for connecting the external terminals of the two electric storage elements arranged in the longitudinal direction out of the bus bars may be formed to correspond to a width of the one face, and the connection portions of the bus bar may be formed to correspond to a width of the external terminal which is smaller than the width of the one face.

With this structure, the plurality of electric storage elements are disposed so that the one faces on which the external terminals are disposed are arranged in the longitudinal direction and the short-side direction. When the bus bar connects the external terminals of the two electric storage elements arranged in the longitudinal direction, the main body portion is formed to correspond to the width of the one face and the connection portions are formed to correspond to the width of the external terminal which is smaller than the width of the one face. As a result, it is possible to alleviate the constraint on the layout or the constraint on the disposition space in placing the connection portions on the external terminals. Because the width of the main body portion is not small, it is possible to obtain the appropriate current capacity with the bus bar as a whole. Furthermore, the width of the main body portion is not larger than the widths of the one faces or does not protrude to a large extent. Therefore, it is possible to prevent interference between the bus bars connected to the electric storage elements adjacent to each other in the short-side direction.

According to yet another example of the present invention, the thin-walled portion may be formed in a stepped shape.

According to another example of the present invention, the thin-walled portion may be formed in a shape having a thickness decreasing toward an outer edge.

In this case, an end portion of the connection portion may be in a semi arch shape.

With this structure, because the end portion of the connection portion is in the semi arch shape, the outer edge of the connection portion does not have a corner portion. In welding at least a part of the outer edge of the connection portion and the external terminal along the outer edge of the connection portion, if there is a corner portion, welding speed drops there and homogeneity of a welded portion is impaired. However, if there is no corner portion, the welding can be carried out continuously at a constant speed and therefore it is possible to form a homogenous welded portion of a certain length.

A manufacturing method of an electric storage device according to another aspect of the present invention is the manufacturing method of the electric storage device, which includes an electric storage element having an external terminal and a bus bar connected to the external terminal, and the method includes the step of welding a thin-walled portion, which is formed at the bus bar, and the external terminal.

With this configuration, the thin-walled portion formed at the bus bar and the external terminal of the electric storage element are welded together. Thus, it is possible to reduce the output energy required for the welding as compared with the case in which the thin-walled portion is not provided. As a result, it is possible to prevent the damage to the periphery of the external terminal of the electric storage element and the inside of the electric storage element due to the influence of the heat in the welding.

According to an example of the manufacturing method of the electric storage device, the welding is preferably laser welding.

With this configuration, the external terminal and the bus bar are directly connected to each other. In other words, because the external terminal and the bus bar are welded together by the laser welding, they are connected while melting into each other. Therefore, the bus bar is connected to the external terminal in a mechanically and electrically preferable manner.

In this case, the laser welding may be perpendicular application of a laser beam to the bus bar.

With this configuration, even if welding equipment does not have a mechanism for changing/adjusting an inclination angle of a welding head for emitting the laser beam, it is possible to appropriately weld the thin-walled portion. Therefore, large-scale welding equipment is not required.

A bus bar according to another aspect of the present invention is the bus bar to be connected to an external terminal of an electric storage element having the external terminal, and the bus bar includes a thin-walled portion to be welded to the external terminal.

With this structure, the thin-walled portion provided to the bus bar and the external terminal of the electric storage element are welded together. Thus, it is possible to reduce the output energy required for the welding as compared with the case in which the thin-walled portion is not provided. As a result, it is possible to prevent the damage to the periphery of the external terminal of the electric storage element and the inside of the electric storage element due to the influence of the heat in the welding.

A bus bar according to another aspect of the present invention is the bus bar for connecting external terminals of two electric storage elements respectively having the external terminals, and the bus bar includes thin-walled portions, to be welded to the external terminals of the two electric storage elements, at least at two portions.

With this structure, the thin-walled portions and the external terminals of the electric storage elements are welded together. Thus, it is possible to suppress the output energy required for the welding as compared with the case in which the thin-walled portion is not provided. As a result, it is possible to prevent the damage to the periphery of the external terminal of the electric storage element and the inside of the electric storage element due to the influence of the heat in the welding. In the bus bar, because the thin-walled portion at the one portion is connected to the external terminal of the one electric storage element and the thin-walled portion at the other portion is connected to the external terminal of the other electric storage element, the bus bar connects the external terminals of the two electric storage elements. As a result, the two electric storage elements electrically form one electric storage element.

As described above, the aspect of the present invention can provide the electric storage device, in which deterioration of quality of the electric storage element due to the influence of the heat in the welding of the bus bar to the external terminal of the electric storage element can be suppressed, and the manufacturing method of the electric storage device.

The aspect of the present invention can also provide the bus bar which can suppress deterioration of quality of the electric storage element due to the influence of the heat in the welding to the external terminal of the electric storage element.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Figure 1:
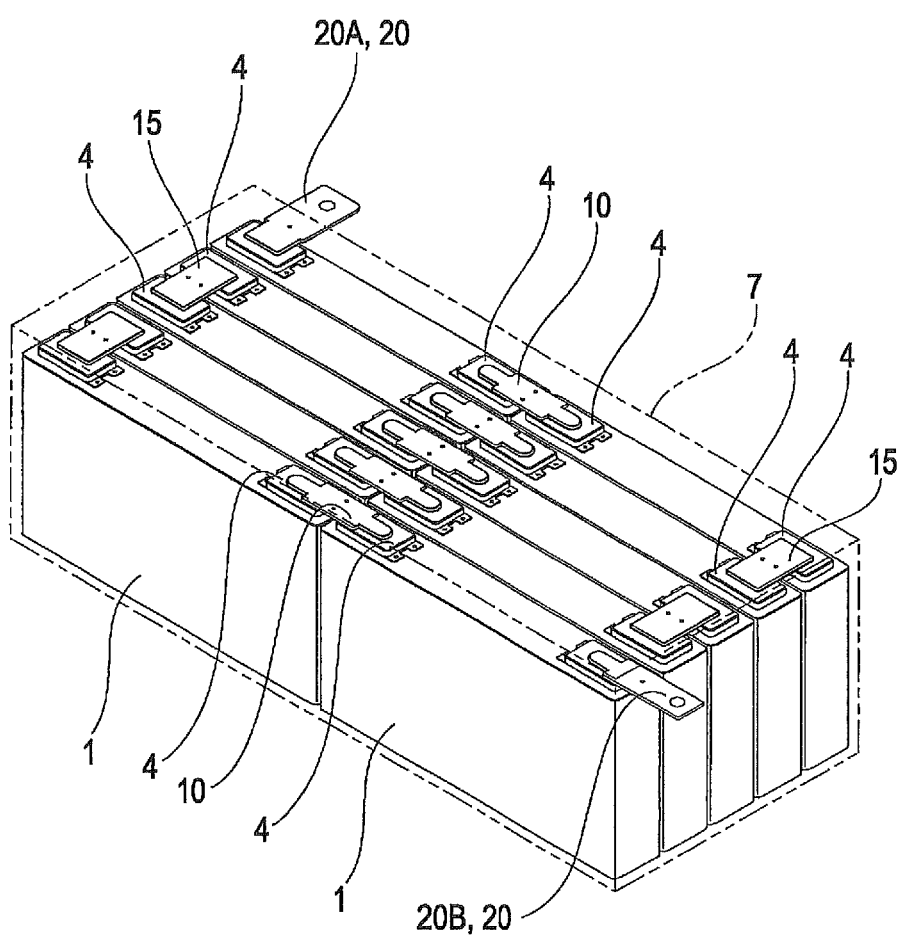
FIG. 1 shows a perspective view of a battery module according to an embodiment of the present invention.
Figure 2:
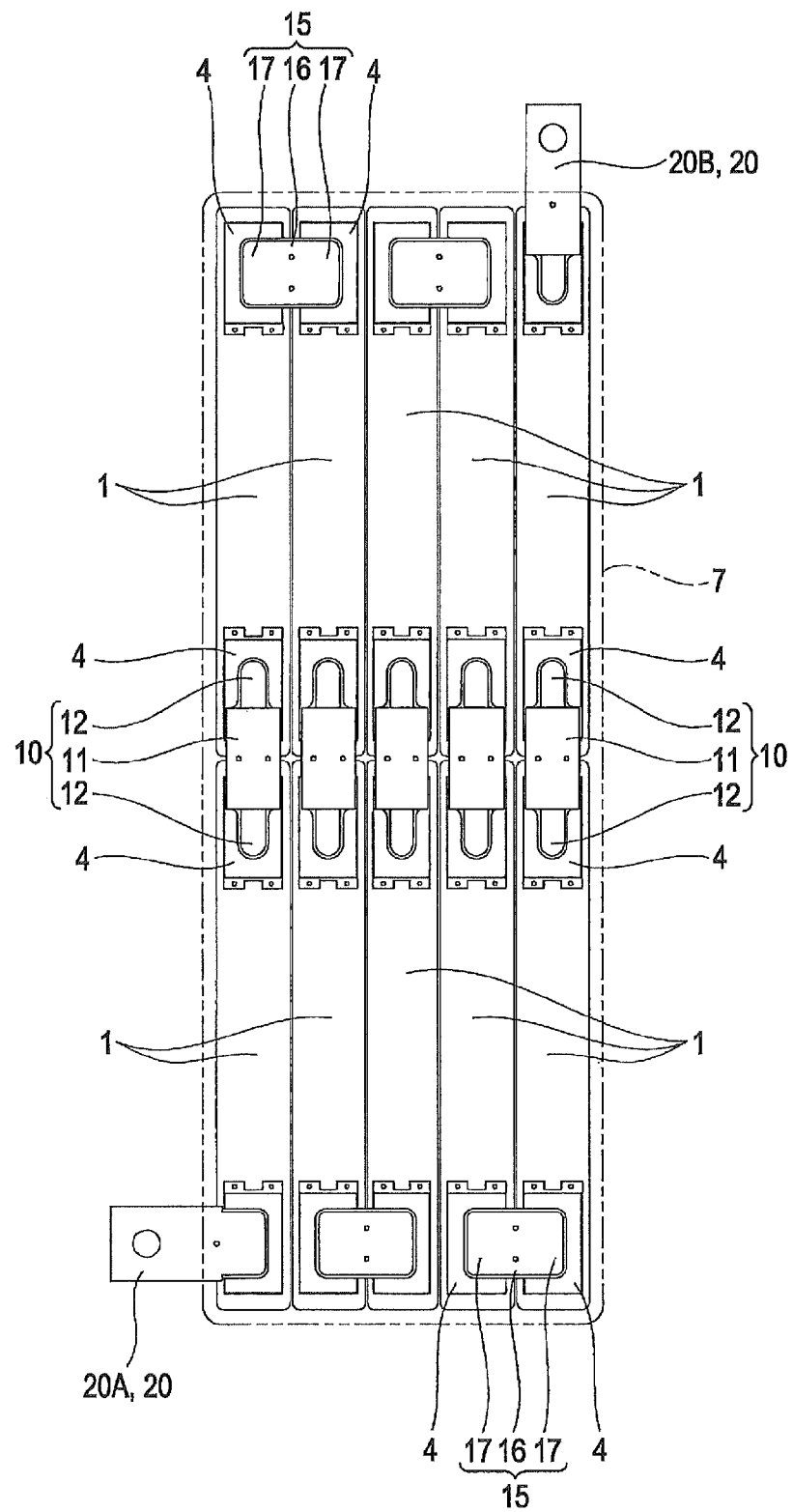
FIG. 2 shows a plan view of the battery module.

A battery module which is an embodiment of an electric storage device according to the present invention will be described below with reference to the drawings. As shown in FIGS. 1 and 2, the battery module according to the embodiment includes a plurality of battery cells 1, . . . and a housing 7 for housing the plurality of battery cells 1, . . . .

Figure 3:
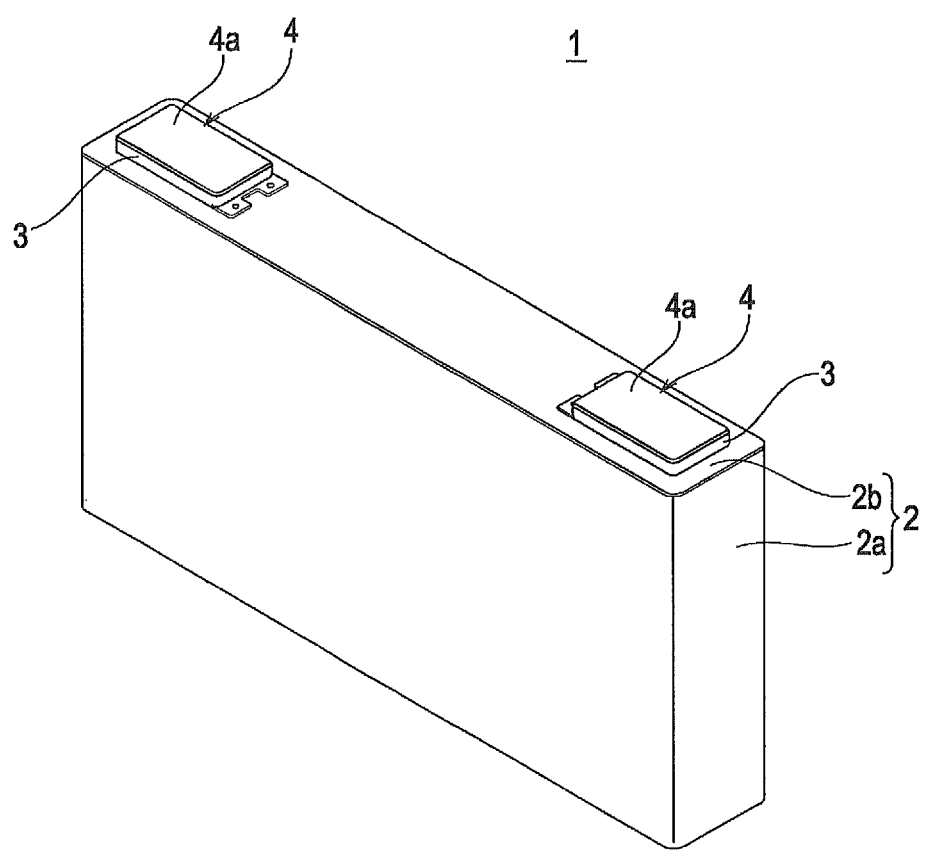
FIG. 3 shows a perspective view of each battery cell forming the battery module.

As shown in FIG. 3, the battery cell 1 includes a case 2 formed by a case main body 2a having an opening portion and a lid plate 2b for closing and sealing the opening portion of the case main body 2a. In the case 2, a power generating element (not shown) is housed.

As the battery cell 1, a prismatic cell having an external appearance of a rectangular parallelepiped or a round cell having an external appearance of a circular column may be employed. The battery cell 1 according to the embodiment is a prismatic cell. Therefore, the case main body 2a is in a rectangular cylindrical shape having a bottom and is flat in a width direction, and the lid plate 2b is a plate member in a rectangular shape corresponding to the opening portion of the case main body 2a.

External gaskets 3 are disposed on an outer face of the case 2, and more specifically, an outer face of the lid plate 2b. An external terminal 4 is disposed on an outer face of each of the external gaskets 3. In the embodiment, the external gasket 3 has a recessed portion and the external terminal 4 is disposed in the recessed portion. The external terminal 4 is made of aluminum or aluminum-based metal material such as an aluminum alloy. Here, through holes (not shown) are formed in the lid plate 2b and through holes (not shown) are formed in the external gaskets 3 as well. The external gaskets 3 are disposed on the outer face of the lid plate 2b such that their through holes are aligned with the through holes in the lid plate 2b. Each of the external terminals 4 has a shaft portion (not shown) passing through the through holes. The shaft portion of the external terminal 4 passing through the external gasket 3 and the lid plate 2b through the two through holes is connected to a current collector (not shown) connected to the power generating element. Thus, the external terminal 4 is electrically connected to the power generating element.

The external gaskets 3 and the external terminals 4 are provided for a positive electrode and a negative electrode. The external gasket 3 and the external terminal 4 for the positive electrode are disposed at one end portion in a longitudinal direction of the lid plate 2b. The external gasket 3 and the external terminal 4 for the negative electrode are disposed at the other end portion in the longitudinal direction of the lid plate 2b. The external gasket 3 and the external terminal 4 for the positive electrode and the external gasket 3 and the external terminal 4 for the negative electrode are disposed at the equal leftward and rightward distances from an intermediate position in the longitudinal direction of the lid plate 2b.

The external gasket 3 and the external terminal 4 are in rectangular shapes in a plan view. The external gaskets 3 and the external terminals 4 are in shapes of rectangles which are long in the longitudinal direction of the lid plate 2b and short in a short-side direction (a width direction of the lid plate 2b) of the lid plate 2b. In the embodiment, the "rectangle" refers to a concept including a shape having not 90-degree but rounded corners and a shape close to a rectangle (a shape which can be recognized as a rectangle as a whole).

An upper portion of each of the external terminals 4 is formed as a flat face 4a. Because the external terminal 4 is in the rectangular shape in the plan view, the flat face 4a is in a rectangular shape as well. Needless to say, the flat face 4a of the external terminal 4 is in the rectangular shape which is long in the longitudinal direction of the lid plate 2b and short in the short-side direction of the lid plate 2b (the width direction of the lid plate 2b). The flat face 4a of the external terminal 4 is in a position separated from an outer face of the lid plate 2b. The flat face 4a of the external terminal 4 protrudes from the external gasket 3. The flat face 4a of the external terminal 4 for the positive electrode and the flat face 4a of the external terminal 4 for the negative electrode are at the same height from the outer face of the lid plate 2b.

Referring back to FIGS. 1 and 2, the plurality of battery cells 1, . . . are arranged in lines and rows so that the lid plates 2b are arranged in the longitudinal direction and the short-side direction. In the embodiment, if the arrangement in the longitudinal direction of the lid plate 2b is referred to as lines and the arrangement in the short-side direction of the lid plate 2b is referred to as rows, the ten battery cells 1, . . . are arranged in two lines and five rows. The battery cells 1 in the adjacent rows are disposed to be opposite in polarity so that all the battery cells 1, . . . are connected in series to form one battery by connecting the adjacent external terminals 4, 4.

The external terminals 4 of the battery cells 1, 1 arranged in the line direction (the longitudinal direction of the battery cell 1 or the lid plate 2b) are connected by a first bus bar 10. The external terminals 4, 4 of the battery cells 1, 1 arranged in the row direction (the short-side direction of the battery cell 1 or the lid plate 2b) are connected by a second bus bar 15. More specifically, the external terminal 4 for the positive electrode of one of the battery cells 1, 1 adjacent to each other in the line direction and the external terminal 4 for the negative electrode of the other of the battery cells are close to each other and are connected by the first bus bar 10. The external terminal 4 for the positive electrode of one of the battery cells 1, 1 adjacent to each other in the row direction and the external terminal 4 for the negative electrode of the other of the battery cells are close to each other and are connected by the second bus bar 15.

Third bus bars 20 are respectively connected to the external terminal 4 at one end of the battery cells 1, ... connected in series and to the external terminal at the other end of the battery cells. In the embodiment, the third bus bar 20A for the positive electrode and the third bus bar 20B for the negative electrode are in different forms. These third bus bars 20 are bus bars for external connections and to be connected to other battery modules, another device or load, or a power supply.

Figure 4A:
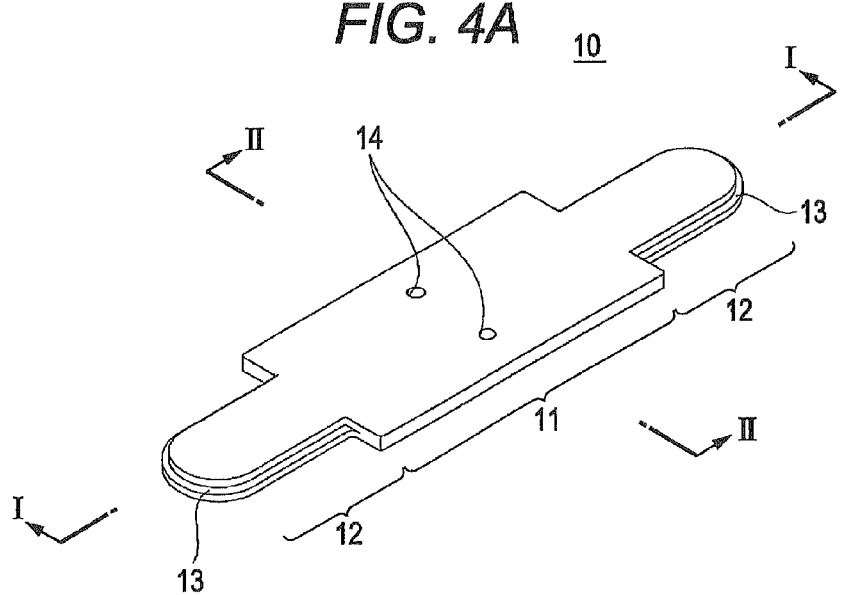
FIG. 4A shows a perspective view of a first bus bar for connecting the battery cells.
Figure 4B:
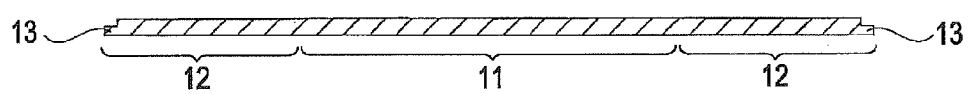
FIG. 4B shows a sectional view along line I-I in FIG. 4A.
Figure 4C:
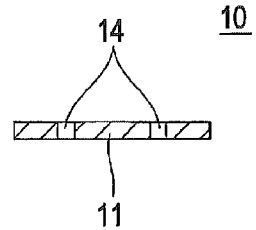
FIG. 4C shows a sectional view along line II-II in FIG. 4A.

The first bus bar 10 (hereafter simply referred to as "bus bar 10" in some cases) includes a main body portion 11 and a pair of connection portions 12, 12 provided to both ends of the main body portion 11 as shown in FIGS. 4A to 4C. The connection portions 12 are portions to be placed on the flat faces 4a of the external terminals 4 and connected to the external terminals 4. The main body portion 11 connects the pair of connection portions 12, 12.

The connection portions 12 have smaller widths than the main body portion 11. More specifically, the main body portion 11 is formed to correspond to a width of the lid plate 2b, i.e., a width of the battery cell 1 and the connection portions 12 are formed to correspond to widths of the external terminals 4 (external size of the external terminals 4 in the width direction of the lid plate 2b). Here, the phrase, "correspond to" refers to a state in which the width of the main body portion 11 is in a range of 50 to 150% of the width of the battery cell 1 and a state in which the widths of the connection portions 12 are in a range of 50 to 100% of the widths of the external terminals 4.

In the embodiment, the main body portion 11 is in a rectangular shape in a plan view. Each of the connection portions 12 is in a rectangular shape having a tip end rounded into a semi arch shape in a plan view. Both of the main body portion 11 and the connection portions 12 are formed by plate members made of aluminum or aluminum-based metal material such as an aluminum alloy.

Each of the connection portions 12 has a thin-walled portion 13. The thin-walled portion 13 is formed in a stepped shape. In other words, the connection portion 12 includes the thin-walled portion 13 and a portion (a thick-walled portion) other than the thin-walled portion 13 and having a larger thickness than the thin-walled portion 13. Therefore, the thin-walled portion 13 has a smaller thickness than the portion (thick-walled portion) of the connection portion 12 and other than the thin-walled portion 13. The portion (thick-walled portion) of the connection portion 12 and other than the thin-walled portion 13 has the same thickness as the main body portion 11 and the thin-walled portion 13 has the smaller thickness than the other portion (thick-walled portion) of the connection portion 12 and the main body portion 11. The thin-walled portion 13 is formed along an outer edge of the connection portion 12. More specifically, the thin-walled portion 13 is formed into a band shape covering three continuous sides, i.e., opposed two sides along the longitudinal direction of the first bus bar 10 and one side connected to the opposed two sides.

The thin-walled portion 13 is formed to protrude outward from a lower area of an outer end face of the connection portion 12. The thin-walled portion 13 is formed by removing an outer edge portion of an upper face (a face opposite from a face (a lower face of the connection portion 12) to be connected to the external terminal 4) of the connection portion 12. In other words, the thin-walled portion 13 is a stepped portion. The thin-walled portion 13 is formed by machining such as press forming, extrusion, cutting, and electric discharge machining, for example.

An upper face of the thin-walled portion 13 is parallel to a lower face of the thin-walled portion 13 and the lower face of the connection portion 12. In other words, the thin-walled portion 13 has the uniform thickness. It is also possible that the upper face of the thin-walled portion 13 is an inclined face so that the thickness of the thin-walled portion 13 decreases toward an outer edge (see FIGS. 8A to 8C).

In the main body portion 11, holes 14 are formed. The holes 14 are holes into which a terminal (not shown) of a voltage measuring line and a terminal (not shown) of a temperature measuring line connected to a cell monitor unit (CMU) are mounted. These terminals are formed as rivets and mounted by being inserted into the holes 14 and caulked. Or, the holes 14 are threaded, external threads are formed on the terminals, and the terminals are mounted by screwing. It is also possible that the terminals are mounted by being press-fitted into the holes 14. However, the method of mounting is not limited to them. In the embodiment, the two holes 14, 14, i.e., the hole 14 into which the terminal of the voltage measuring line is mounted and the hole 14 into which the temperature measuring line is mounted are formed. The holes 14 may be through holes passing through the main body portion 11 from a front to a back or may be non-through holes not passing through the main body portion 11.

Figure 5A:
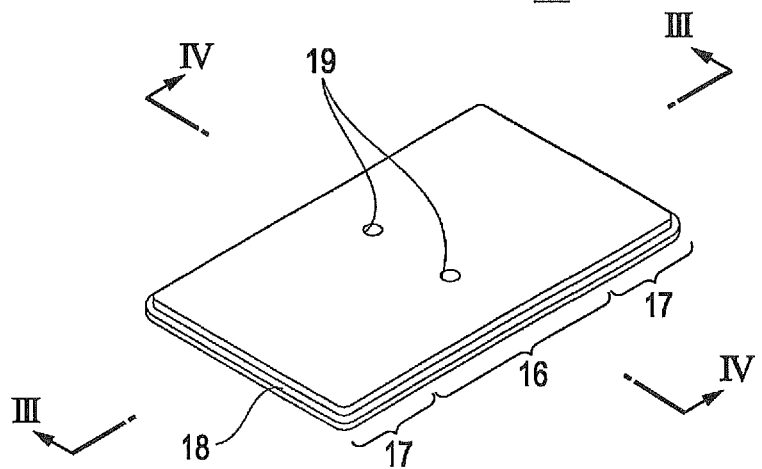
FIG. 5A shows a perspective view of a second bus bar for connecting the battery cells.
Figure 5B:
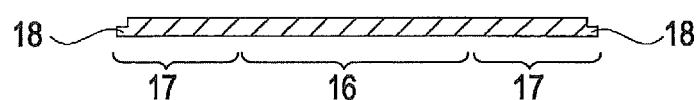
FIG. 5B shows a sectional view along line III-III in FIG. 5A.
Figure 5C:
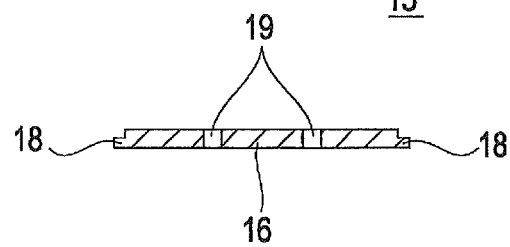
FIG. 5C shows a sectional view along line IV-IV in FIG. 5A.

The second bus bar 15 (hereafter simply referred to as "bus bar 15" in some cases) includes a main body portion 16 and a pair of connection portions 17, 17 provided to both ends of the main body portion 16 as shown in FIGS. 5A to 5C. The connection portions 17 are portions to be placed on the flat faces 4a of the external terminals 4 and connected to the external terminals 4. The main body portion 16 connects the pair of connection portions 17, 17.

In the embodiment, the main body portion 16 is in a rectangular shape in a plan view. Each of the connection portions 17 is in a rectangular shape having rounded corner portions in a plan view. Both of the main body portion 16 and the connection portions 17 are formed by plate members made of aluminum or aluminum-based metal material such as an aluminum alloy.

Each of the connection portions 17 has a thin-walled portion 18. The thin-walled portion 18 is formed in a stepped shape. In other words, the connection portion 17 includes the thin-walled portion 18 and a portion (a thick-walled portion) other than the thin-walled portion 18 and having a larger thickness than the thin-walled portion 18. Therefore, the thin-walled portion 18 has a smaller thickness than the portion (thick-walled portion) of the connection portion 17 and other than the thin-walled portion 18. The portion (thick-walled portion) of the connection portion 17 and other than the thin-walled portion 18 has the same thickness as the main body portion 16 and the thin-walled portion 18 has the smaller thickness than the other portion (thick-walled portion) of the connection portion 17 and the main body portion 16. The thin-walled portion 18 is formed along an outer edge of the connection portion 17. More specifically, the thin-walled portion 18 is formed into a band shape covering three continuous sides, i.e., opposed two sides along the longitudinal direction of the second bus bar 15 and one side connected to the opposed two sides.

In the embodiment, thin-walled portions 18 are formed along outer edges of the main body portion 16 as well. More specifically, the thin-walled portions 18 are formed into band shapes covering opposed two sides of the main body portion 16 and along the longitudinal direction of the second bus bar 15. The thin-walled portions 18 formed at the connection portions 17 and the thin-walled portions 18 formed at the main body portion 16 are continuous with each other. Therefore, the thin-walled portions 18 are formed into an annular shape extending around an outer edge of the second bus bar 15. Therefore, in the second bus bar 15, the thickness of the main body portion 16 means a maximum thickness (a plate thickness).

The thin-walled portions 18 are formed to protrude outward from lower areas of outer end faces of the connection portions 17 (and the main body portion 16). The thin-walled portions 18 are formed by removing outer edge portions of upper faces (faces opposite from faces (lower faces of the connection portions 17 (and the main body portion 16)) to be connected to the external terminals 4) of the connection portions 17 (and the main body portion 16). In other words, the thin-walled portions 18 are stepped portions. The thin-walled portions 18 are formed by machining such as press forming, cutting, and electric discharge machining, for example.

Upper faces of the thin-walled portions 18 are parallel to the lower faces of the thin-walled portions 18 and the lower faces of the connection portions 17. In other words, the thin-walled portion 18 has the uniform thickness. It is also possible that the upper faces of the thin-walled portions 18 are inclined faces so that the thicknesses of the thin-walled portions 18 decrease toward outer edges (see FIGS. 8A to 8C).

In the main body portion 16, holes 19 are formed. The holes 19 are holes into which a terminal (no shown) of a voltage measuring line and a terminal (not shown) of a temperature measuring line connected to the cell monitor unit are mounted. These terminals are formed as rivets and mounted by being inserted into the holes 19 and caulked. Or, the holes 19 are threaded, external threads are formed on the terminals, and the terminals are mounted by screwing. It is also possible that the terminals are mounted by being press-fitted into the holes 19. However, the method of mounting is not limited to them. In the embodiment, the two holes 19, 19, i.e., the hole 19 into which the terminal of the voltage measuring line is mounted and the hole 19 into which the temperature measuring line is mounted are formed. The holes 19 may be through holes passing through the main body portion 16 from a front to a back or may be non-through holes not passing through the main body portion 16.

Here, methods of connecting the bus bars 10 and 15 to the battery cells 1 will be described.

Figure 6A:
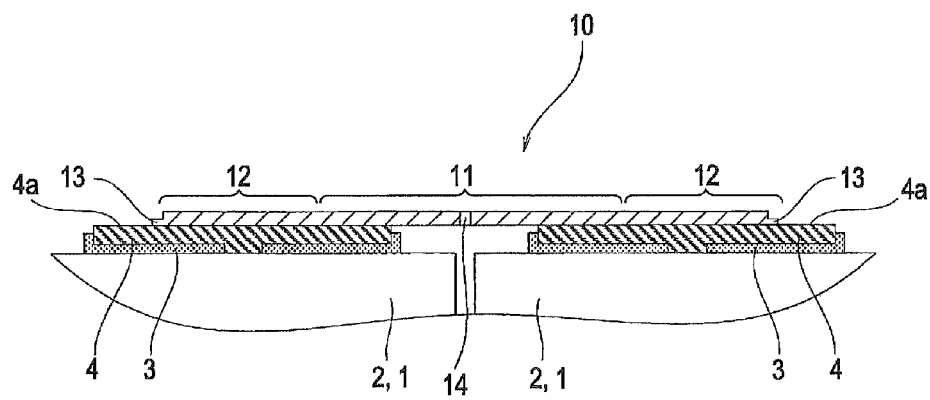
FIG. 6A shows a partial enlarged sectional view of a state in which the first bus bar is placed astride two external terminals of adjacent battery cells and FIG. 6B shows a partial enlarged sectional view of a state in which the first bus bar is welded to the external terminals.
Figure 7A:
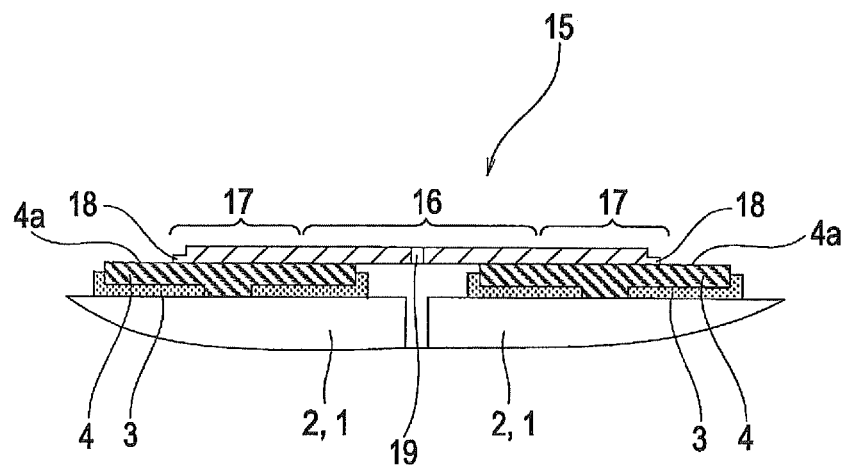
FIG. 7A shows a partial enlarged sectional view of a state in which the second bus bar is placed astride two external terminals of adjacent battery cells and FIG. 7B shows a partial enlarged sectional view of a state in which the second bus bar is welded to the external terminals.

First, the plurality of battery cells 1, . . . are arranged in lines and rows and conveyed into an operating area (hereafter referred to as "welding area") of a welding device. Specifically, the plurality of batteries 1, . . . are arranged in the same lines and rows as those of a finished layout on a conveying device such as a belt conveyor and then conveyed into the welding area by the conveying device. When the plurality of battery cells 1, . . . reach the welding area, as shown in FIGS. 6A and 7A, the bus bars 10 and 15 are placed astride the external terminals 4, 4 of the adjacent battery cells 1. In other words, each of the first bus bars 10 is placed astride the external terminals 4, 4 of the two battery cells 1, 1 arranged in the line direction as shown in FIG. 6A and each of the second bus bars 15 is placed astride the external terminals 4, 4 of the two battery cells 1, 1 arranged in the row direction as shown in FIG. 7A. In this state, the thin-walled portions 13 and 18 of the connection portions 12 and 17 of the bus bars 10 and 15 and the external terminals 4 laid under them are respectively welded to each other by the welding device.

More specifically, an automatic feeding device for placing the bus bars 10 and 15 on the battery cells 1 is disposed next to the welding device in the welding area. The automatic feeding device is taught to move holders formed to be able to hold the bus bars 10/15 between a first position for receiving the bus bars 10/15 and a second position for placing the bus bars 10/15 astride the external terminals 4, 4 of the battery cells 1, . . . arranged in lines/rows. It is also possible that automatic feeding devices adapted to the respective bus bars 10 and 15 are disposed to handle plural kinds of bus bars 10 and 15. In the embodiment, the one automatic feeding device is taught to be able to place the first bus bars 10 and the second bus bars 15 on the battery cells 1. Each of the holders is provided with protrusions (tapered protrusions) which can be inserted into the holes 14/19 formed in the main body portion 11/16 of the bus bar 10/15. When the protrusions of the holder are fitted into the holes 14/19 of the bus bar 10/15, the bus bar 10/15 is arranged in a certain way (positioned). Because the two holes 14/19 are formed in the main body portion 11/16 of the bus bar 10/15, the holder has the two protrusions. Thus, the holder can prevent displacement (turning) of the held bus bar 10/15.

As described above, because the first bus bars 10 and the second bus bars 15 are placed by the one automatic feeding device, the holders turn 90° about certain axes so as to adapt arrangement of the protrusions of the holders to arrangement of the holes 14/19 of the bus bars 10/15. In this manner, the automatic feeding device is switched between a state for placing the first bus bars 10 on the battery cells 1 and a state for placing the second bus bars 15 on the battery cells 1.

The second position is set in a position where the protrusions of each of the holders are positioned between the battery cells 1, 1 and each of the holders pushes the bus bar 10/15 against the external terminals 4. Thus, when each of the holders reaches the second position, the bus bar 10/15, which is always in certain arrangement with respect to the external terminals 4, 4 of the two battery cells 1, 1, is pushed against the external terminals 4, 4. For the automatic feeding device, the first position and the second position for feeding the first bus bar 10 and the first position and the second position for feeding the second bus bar 15 are set to be different.

The conveying device conveys the plurality of battery cells 1, . . . in a direction corresponding to the longitudinal direction of the battery cell 1. A line of battery cells 1, . . . out of the battery cells 1, . . . arranged in two lines reach the welding area first. Then, the automatic feeding device moves each of the holders from the first position to the second position and places each of the second bus bars 15 astride the external terminals 4, 4 of the battery cells 1, 1 adjacent to each other in the row direction as shown in FIG. 7A. It is also possible to successively place the bus bars 10, . . . /15, . . . according to the number of battery cells 1, . . . arranged in a row by holding the one bus bar 10/15 with the holder and reciprocating the holder a plurality of times. In the embodiment, however, the holders are formed to be able to hold the bus bars 10, . . . /15, . . . according to the number of battery cells 1, . . . arranged in a row at one time. Therefore, the second bus bars 15 are respectively placed on the adjacent battery cells 1, 1 . . . of the plurality of battery cells 1, . . . arranged in a row.

Then, while the holders are maintained in the second position, the welding device welds the connection portions 17 of the second bus bars 15 and the external terminals 4 laid under them. In other words, the connection portions 17 of the second bus bars 15 are welded to the external terminals 4 of the battery cells 1 while prevented from being displaced with respect to the external terminals 4 of the battery cells 1 by the holders. A laser welding device is employed as the welding device and a welding head for emitting a laser beam is moved along outer edges (thin-walled portions 18) of the connection portions 17 of the second bus bars 15. In order to weld the thin-walled portions 18 provided along the outer edges of the connection portions 17 to the external terminals 4, the welding head emits the laser beam while forming a right angle with the upper face of each of the thin-walled portions 18.

Figure 7B:
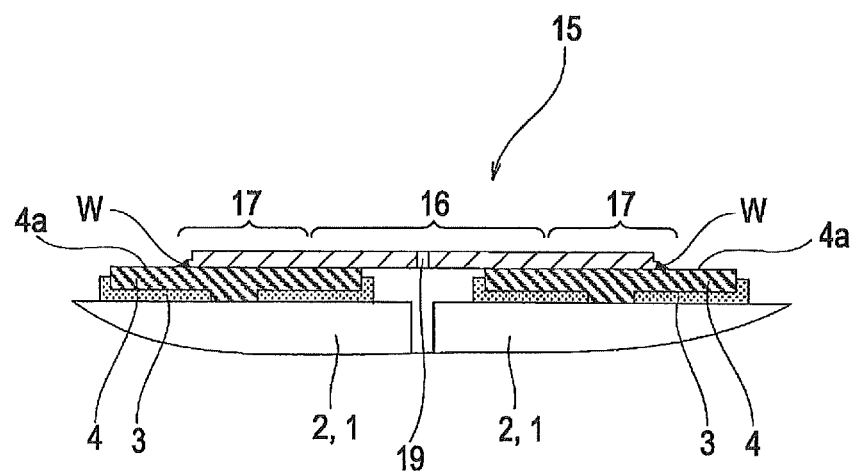

In this manner, as the welding head moves while emitting the laser beam, the thin-walled portions 18 of each of the second bus bars 15 positioned by the holder and the flat faces 4a of the external terminals 4 are welded together. In other words, when the thin-walled portions 18 of the connection portions 17 and the external terminals 4 are welded together by the laser welding, the welded thin-walled portions 18 melt into the external terminals 4 to thereby form welding seams W along the connection portions 17 as shown in FIG. 7B. As a result, each of the second bus bars 15 is electrically and mechanically connected to the external terminals 4 of the battery cells 1.

Figure 6B:
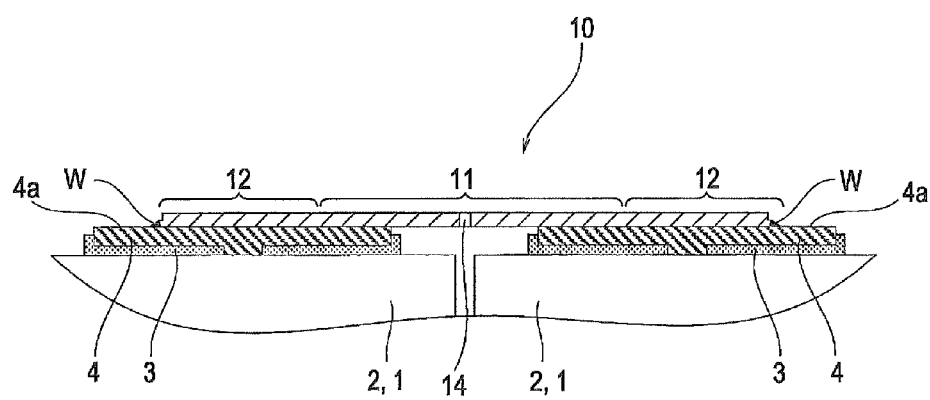

Then, the automatic feeding device moves the holders to the first position, the holders hold the first bus bars 10, and the conveying device moves the plurality of battery cells 1, . . . . When both of the battery cells 1, 1 arranged in two lines reach the welding area, the automatic feeding device moves the holders from the first position to the second position and places each of the first bus bars 10 astride the external terminals 4, 4 of the battery cells 1, 1 adjacent to each other in the line direction as shown in FIG. 6A. Then, while the holders maintain the bus bars 10 disposed in the second position, the welding device welds the connection portions 12 of the first bus bars 10 and the external terminals 4 laid under them. In other words, the connection portions 12 of the first bus bars 10 are welded to the external terminals 4 of the battery cells 1 while prevented from being displaced with respect to the external terminals 4 of the battery cells 1 by the holders. In other words, as the welding head moves while emitting a laser beam, the thin-walled portions 13 of each of the bus bars 10 positioned by the holder and the flat faces 4a of the external terminals 4 are welded together. The welded thin-walled portions 13 melt into the external terminals 4 to thereby form welding seams W along the connection portions 12 in this case as well as shown in FIG. 6B. As a result, each of the first bus bars 10 is electrically and mechanically connected to the external terminals 4 of the battery cells 1.

Then, the automatic feeding device moves the holders to the first position, the holders hold the second bus bars 15, and the conveying device moves the plurality of battery cells 1, . . . . When the latter line of the battery cells 1, 1 arranged in two lines reaches the welding area, the automatic feeding device moves the holders from the first position to the second position and places each of the second bus bars 15 astride the external terminals 4, 4 of the battery cells 1, 1 adjacent to each other in the row direction as shown in FIG. 7A. Then, similarly to the connection of the bus bars 15 to the external terminals 4 in the previous example, the thin-walled portions 18 of the bus bars 15 and the flat faces 4a of the external terminals 4 are welded together by the welding device (see FIG. 7B). As a result, each of the second bus bars 15 is electrically and mechanically connected to the external terminals 4 of the battery cells 1.

Then, by housing the plurality of battery cells 1, . . . electrically connected by the bus bars 10 and 15 into the housing 7, a high-volume battery module is completed.

As described above, according to the battery module and the manufacturing method of the battery module according to the embodiment, the thin-walled portions 13/18 of the bus bars 10/15 and the external terminals 4 of the battery cells 1 are welded together. Therefore, as compared with a case in which the thin-walled portions 13 and 18 are not provided, output energy required for the welding can be reduced. As a result, it is possible to prevent damage to the peripheries of the external terminals 4 of the battery cell 1 and an inside of the battery cell 1, and more specifically to the external gaskets 3 on which the external terminals 4 are placed and the power generating element connected to the external terminals 4 in the battery cell 1 due to influence of heat in the welding.

If the laser beam is emitted diagonally downward and applied on lower portions of the bus bars 10 and 15 instead of being emitted down from above for welding, it is possible to reduce the output energy required for the welding without providing the thin-walled portions 13 and 18. For this purpose, however, a mechanism for changing/adjusting an inclination angle (an inclination angle with respect to a Z axis when the bus bars 10 and 15 are placed in an XY plane) of the welding head for outputting the laser beam is required, which increases scale of welding equipment. Besides, the welding head rotates about the Z axis while moving in the XY plane in the laser welding of the arc portions, for example, of the bus bars 10 and 15 and therefore a machining program for controlling this movement becomes complicated and takes time and cost to produce. Moreover, as compared with the application of the laser beam down from above for the welding, the laser beam emitted diagonally downward for the welding may scatter over a wide area to affect other portions of the battery module. By providing the thin-walled portions 13 and 18, the welding is carried out by only emitting the laser down from above and applying it on the thin-walled portions 13 and 18. Therefore, the large-scale welding equipment is not required, a simple machining program suffices, and the problem of scattering of the laser beam does not occur.

The bus bar 10/15 connects the external terminals 4, 4 of the two battery cells 1, 1 when the thin-walled portion 13/18 at the one portion is connected to the external terminal 4 of the one battery cell 1 and the thin-walled portion 13/18 at the other portion is connected to the external terminal 4 of the other battery cell 1. In this way, the two battery cells 1, 1 electrically form one battery.

Furthermore, the thin-walled portions 13/18 are formed along the outer edges of the connection portions 12/17 of the bus bar 10/15. Therefore, arbitrarily spots of the thin-walled portions 13/18 may be welded or the thin-walled portions 13/18 may be welded continuously along their longitudinal directions in order to increase weld strength. In this manner, it is possible to freely select various forms of welding.

Especially, widths of the connection portions 12 of the first bus bar 10 are smaller than that of the main body portion 11. Therefore, it is possible to reduce welding ranges as compared with a case in which the widths of the connection portions 12 are not smaller than that of the main body portion 11. Because the welding ranges can be reduced, the output energy required for the welding can be reduced as well. As a result, it is possible to suitably prevent heat damage to the bus bar 10, the external terminals 4, the external gaskets 3 on which the external terminals 4 are placed, and the power generating element connected to the external terminals 4. Because the width of the main body portion 11 is not small, it is possible to obtain an appropriate current capacity with the bus bar 10 as a whole.

Because the end portions of the connection portions 12 are semi arch, i.e., the outer edges of the end portions of the connection portions 12 do not have discrete portions, the outer edges of the connection portions 12 do not have corner portions. In welding at least parts of the outer edges of the connection portions 12 and the external terminals 4 along the outer edges of the connection portions 12, if there are corner portions, welding speed drops there and homogeneity of welded portions is impaired. If there are no corner portions, the welding can be carried out continuously at a constant speed and therefore it is possible to form homogenous welded portions W of certain lengths.

Sectional areas of the connection portions 12 of the first bus bar 10 are smaller than a sectional area of the main body portion 11. If the bus bar is formed with a constant width, size of the bus bar is determined from a viewpoint of a constraint on layout or a constraint on a disposition space in placing the connection portions on the external terminals, not to mention a viewpoint of the current capacity of the bus bar. For example, if the width of the bus bar is determined from the viewpoint of the constraint on the layout or the constraint on the disposition space in placing the connection portions on the external terminals, the width of the whole bus bar becomes small. As a result, the current capacity of the whole bus bar decreases. On the other hand, if the width of the bus bar is determined so as to obtain the appropriate current capacity of the whole bus bar, the widths of the connection portions become large as well. Therefore, it may be impossible to appropriately place the connection portions on the external terminals. However, if the sectional areas of the connection portions 12 are smaller than the sectional area of the main body portion 11, it is possible to alleviate the constraint on the layout or the constraint on the disposition space in placing the connection portions on the external terminals 4. In other words, it is possible to appropriately place the connection portions 12 on the external terminals 4. Because the sectional area of the main body portion 11 is not small, it is possible to obtain the appropriate current capacity with the first bus bar 10 as a whole.

Specifically, the first bus bar 10 is in a plate shape and the widths of the connection portions 12 are smaller than the width of the main body portion 11. As a result, the sectional areas of the connection portions 12 of the first bus bar 10 are smaller than the sectional area of the main body portion 11. Therefore, it is possible to alleviate the constraint on the layout or the constraint on the disposition space in placing the connection portions 12 on the external terminals 4. Because the sectional area of the main body portion 11 is not small, it is possible to obtain the appropriate current capacity with the first bus bar 10 as a whole.

When at least two battery cells 1, 1 are arranged so that their one faces (the outer faces of the lid plates 2b) on which the external terminals 4 are placed are disposed side by side in the longitudinal direction and the first bus bar 10 connects the external terminals 4, 4 of the two battery cells 1, 1, the main body portion 11 is formed to correspond to the widths of the one faces and the connection portions 12 are formed to correspond to widths of the external terminals 4 smaller than those of the one faces. Therefore, it is possible to alleviate the constraint on the layout or the constraint on the disposition space in placing the connection portions 12 on the external terminals 4. Because the width of the main body portion 11 is not small, it is possible to obtain the appropriate current capacity with the first bus bar 10 as a whole.

Moreover, when the plurality of battery cells 1, . . . are arranged so that their one faces (the outer faces of the lid plates 2b) on which the external terminals 4 are placed are disposed side by side in the longitudinal direction and the short-side direction and the first bus bar 10 connects the external terminals 4, 4 of the two battery cells 1, 1 arranged side by side in the longitudinal direction, the main body portion 11 is formed to correspond to the widths of the one faces and the connection portions 12 are formed to correspond to widths of the external terminals 4 smaller than those of the one faces. Therefore, it is possible to alleviate the constraint on the layout or the constraint on the disposition space in placing the connection portions 12 on the external terminals 4. Because the width of the main body portion 11 is not small, it is possible to obtain the appropriate current capacity of the first bus bar 10 as a whole. Furthermore, the width of the main body portion 11 is not larger than the widths of the one faces or does not protrude to a large extent. Therefore, it is possible to prevent interference between the first bus bars 10 connected to the battery cells 1 adjacent to each other in the short-side direction.

The present invention is not limited to the above-described embodiment and can be changed in various ways without departing from the gist of the present invention.

Although the connection portions 12 and 17 (the thick-walled portions) and the main body portions 11 and 16 of the first bus bar 10 and the second bus bar 15 have the same thicknesses in the embodiment, the present invention is not limited to it. For example, the thicknesses of the connection portions (the thick-walled portions) may be larger than those of the main body portions on condition that the thicknesses of the thin-walled portions are smaller than the thicknesses of the connection portions (and preferably, the thicknesses of the connection portions and the main body portions).

In the embodiment, the widths of the connection portions 12 of the first bus bar 10 are uniform (except that the tip end portions are in the semi arch shapes) and the width of the main body portion 11 is uniform as well. Therefore, the width changes discontinuously from each of the connection portions 12 to the main body portion 11 of the first bus bar 10. However, the first bus bar 10 is not limited to this form. For example, the width may change continuously, i.e., the width may increase gradually from each of the connection portions to the main body portion.

In the embodiment, only the first bus bar 10 has a difference between the sectional areas of the main body portion 11 and the connection portions 12. However, the second bus bar 15 may have a difference between sectional areas of the main body portion 16 and the connection portions 17, similarly to the first bus bar 10.

Not only the first bus bar 10 and the second bus bar 15 are included in the technical scope of the present invention. For example, the third bus bar 20 having the connection portion only on one side is also included in the technical scope. In fact, such a structure is employed for the third bus bars 20 (the third bus bar 20A for the positive electrode and the third bus bar 20B for the negative electrode) as shown in FIGS. 1 and 2.

In the embodiment, the thin-walled portions 13 are formed along the outer edges of the connection portions 12 of the first bus bar 10 and the thin-walled portions 18 are formed along the outer edges of the connection portions 17 of the second bus bar 15. However, the portions where the thin-walled portions are formed are not limited to the outer edges of the connection portions. For example, an opening passing through each of the connection portions from a front to a back or an opening formed by notching part of the outer edge of each of the connection portions toward an inner area may be formed and the thin-walled portion may be formed at an inner edge of the opening. The thin-walled portions may be formed as the whole connection portions 12 and 17.

Figure 8A:
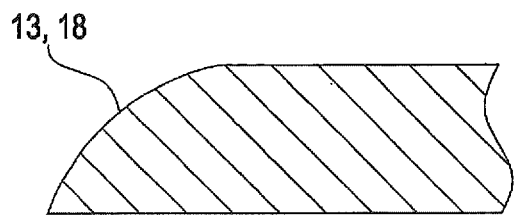
FIG. 8A shows a sectional view of a first variation of a thin-walled portion having a thickness decreasing toward its outer edge so that a central portion is convexed.
Figure 8B:
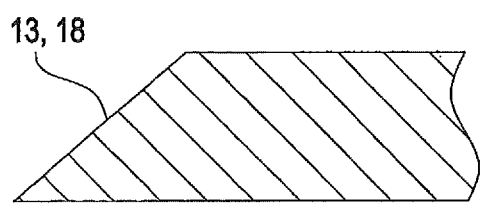
FIG. 8B shows a sectional view of a second variation of the thin-walled portion which is tapered.
Figure 8C:
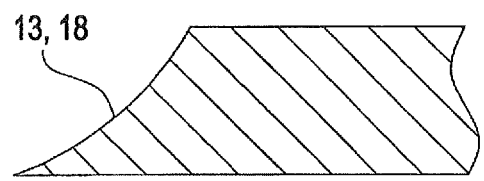
FIG. 8C shows a sectional view of a thin-walled portion having a thickness decreasing toward its outer edge so that a central portion is concaved.
Figure 9A:
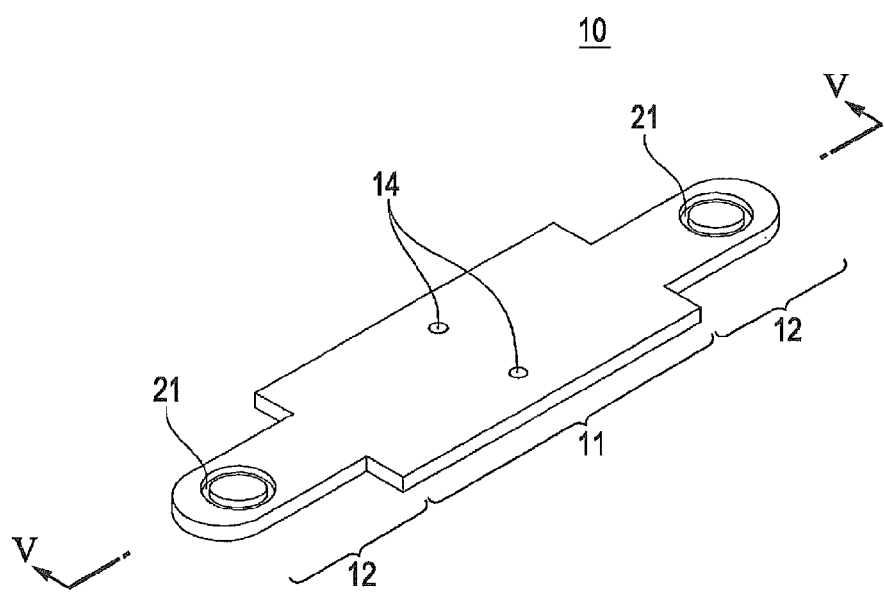
FIG. 9A shows a perspective view of a first variation of the bus bar and FIG. 9B shows a sectional view along line V-V in FIG. 9A.
Figure 9B:
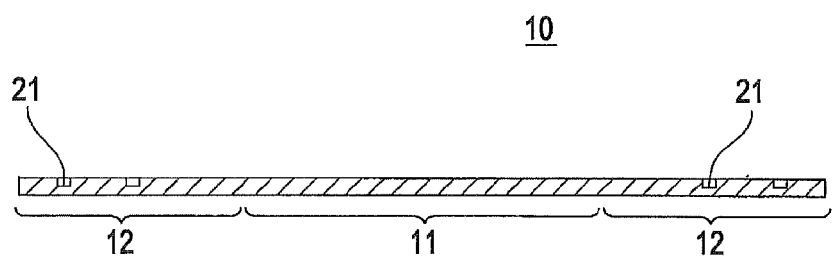
Figure 10A:
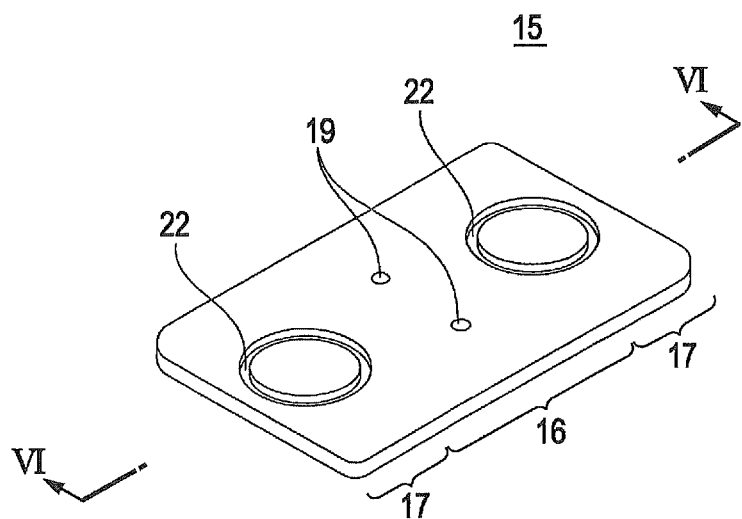
FIG. 10A shows a perspective view of a second variation of the bus bar and FIG. 10B shows a sectional view along line VI-VI in FIG. 10A.
Figure 10B:
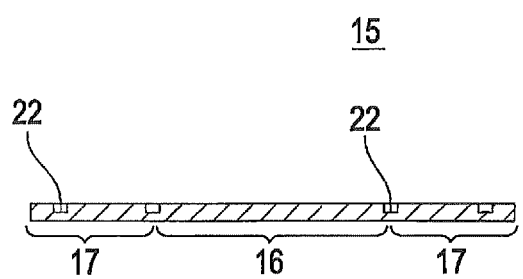

Instead of the openings passing through the connection portions from the fronts to the backs, thin-walled portions 21 and 22 may be formed by forming non-through recessed portions in upper faces or lower faces (preferably, upper faces) of central portions of the connection portions 12 and 17 as shown in FIGS. 9A to 1013. In this case, each of the thin-walled portions 21 and 22 may be formed to have a uniform thickness or a non-uniform thickness. For example, each of the thin-walled portions 21 and 22 may be formed to have the non-uniform thickness so that it has an upper face of an inclined face (as shown in FIGS. 8A to 8C, for example) having the thickness decreasing toward a center of the width of each of the thin-walled portions 21 and 22 or an inner end edge or an outer end edge. Although the thin-walled portions 21 and 22 are in annular shapes and not-thin-walled portions which are not thin-walled portions remain in inner areas in FIGS. 9A to 10B, the whole inner areas may be formed as the thin-walled portions.

In other words, it suffices that the thin-walled portions are thinner than original thicknesses of the plate members forming the bus bars 10 and 15.

If the thin-walled portions 21 and 22 are formed at the central portions of the connection portions 12 and 17, the thin-walled portions 21 and 22 are preferably in shapes such as circles, ovals, and elongated circles from the above-described viewpoint of forming certain lengths of homogeneous welded portions W. In other words, the outer edges of the thin-walled portions 21 and 22 are in closed shapes without discrete portions and therefore it is preferable that the outer edges of the thin-walled portions 21 and 22 do not have corner portions.

Figure 11A:
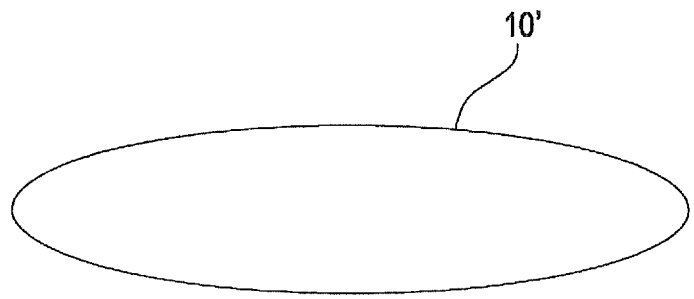
FIG. 11A shows a plan view of a third variation of the bus bar and FIG. 11B shows a plan view of a fourth variation of the bus bar.
Figure 11B:
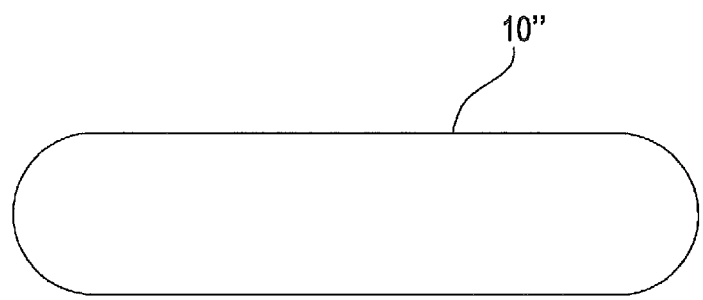

For the same reason, the bus bars may be in shapes such as ovals and elongated circles and shapes having semi arch end portions as shown in FIGS. 11A and 11B.

In the embodiment, the certain lengths of thin-walled portions 13 and 18 are formed continuously. However, the present invention is not limited to it. For example, if arbitrary spots of the connection portions 12 and 17 of the bus bars 10 and 15 are welded, the thin-portions may be formed at least at these spots.

Although the external terminals 4 and the bus bars 10 and 15 are made of aluminum-based metal material in the embodiment, the material is not limited to it. For example, the external terminals 4 and the bus bars 10 and 15 may be made of metal material such as copper, SUS, and steel. In other words, the external terminals 4 and the bus bars 10 and 15 may be made of electrically conductive and weldable metal material.

Although the bus bars 10 and 15 are welded to the external terminals 4 of the battery cells 1 by the laser welding in the embodiment, the welding is not limited to it. For example, normal arc welding or the like may be employed.

In the embodiment, the lithium-ion secondary battery is described. However, the battery may be of any kind and size (capacity).

The present invention is not limited to the lithium-ion secondary battery. The present invention can be applied to various secondary batteries, primary batteries, and capacitors such as an electric double layer capacitor.

In the embodiment, the thin-walled portions 13 are formed at the connection portions 12 and the thin-walled portions 13 and the external terminals 4 are welded together. However, the welding ranges can be reduced by only making the connection portions 12 narrower than the main body portion 11, which reduces the output energy required for the welding. From this point of view, it is technically possible not to provide the thin-walled portions 13 to the connection portions 12. In other words, it is possible to achieve an invention including electric storage elements having external terminals and bus bars each of which has a main body portion and connection portions and is connected to the external terminals at the connection portions, wherein the connection portions have smaller sectional areas than the main body portion.

In the first bus bar 10, the sectional areas of the connection portions 12 are made smaller than the sectional area of the main body portion 11 by making the widths of the connection portions 12 smaller than the width of the main body portion 11 in the embodiment. However, the present invention is not limited to it. For example, the connection portions 12 may have smaller thicknesses than the main body portion 11. Alternatively, the difference between the sectional areas of the connection portions 12 and the main body portion 11 may be provided by a combination of the thicknesses and the widths. The point is to provide the difference between the sectional areas of the connection portions 12 and the main body portion 11 by providing differences between shapes and dimensions including the thicknesses and the widths of the corresponding portions of the first bus bar 10.

In this case, instead of welding the bus bars 10 and 15 and the external terminals 4, the bus bars and the external terminals may be connected by forming the external terminals as bolt terminals, forming holes, through which the bolt terminals are inserted, in the bus bars, and fastening nuts to the bolt terminals, for example.

What is claimed is:

1. An electric storage device, comprising:
   an electric storage element including an external terminal; and
   a bus bar connected to the external terminal, a face of the bus bar which opposes the external terminal being flat,
   wherein the bus bar includes a thin-walled portion and a thick-walled portion, the thin-walled portion being located around outer edges of the thick-walled portion,
   wherein the thin-walled portion and the external terminal are directly welded together,
   wherein a thickness of the thin-walled portion is less than a thickness of a remaining portion of the bus bar including the thick-walled portion, and
   wherein the thin-walled portion has a circular shape that encircles the thick-walled portion.

2. The electric storage device according to claim 1, wherein the electric storage device comprises at least two electric storage elements, and
   wherein the thin-walled portions are provided to at least two portions of the bus bar and welded to the external terminals of the two electric storage elements.

3. The electric storage device according to claim 1, wherein the thin-walled portion is formed at least at a portion of the bus bar in contact with the external terminal.

4. The electric storage device according to claim 1, wherein the thin-walled portion is formed at a central portion in a width direction of the bus bar.

5. The electric storage device according to claim 1, wherein the bus bar includes a main body portion and a connection portion continuous with the main body portion and to be connected to the external terminal, and
   wherein the thin-walled portion is formed at the connection portion.

6. The electric storage device according to claim 5, wherein the connection portion has a smaller width than the main body portion.

7. The electric storage device according to claim 5, wherein the electric storage device comprises at least the two electric storage elements, and
wherein a pair of the connection portions are provided to both ends of the main body portion to connect the external terminals of the two electric storage elements.

8. The electric storage device according to claim 7, wherein each of the electric storage elements includes a case and is in a shape of a flat prism, one face of the case on which the external terminal is disposed is in a rectangular shape, and at least the two electric storage elements are disposed so that the one faces are arranged in a longitudinal direction,
wherein the main body portion is formed to correspond to a width of the one face, and
wherein the connection portions are formed to correspond to a width of the external terminal which is smaller than the width of the one face.

9. The electric storage device according to claim 7, wherein each of the electric storage elements includes a case and is in a shape of a flat prism, one face of the case on which the external terminal is disposed is in a rectangular shape, the plurality of electric storage elements are disposed in lines and rows so that the one faces are arranged in a longitudinal direction and a short-side direction,
wherein the main body portion of the bus bar for connecting the external terminals of the two electric storage elements arranged in the longitudinal direction out of the bus bars is formed to correspond to a width of the one face, and
wherein the connection portions of the bus bar are formed to correspond to a width of the external terminal which is smaller than the width of the one face.

10. The electric storage device according to claim 1, wherein the thin-walled portion is formed in a stepped shape.

11. The electric storage device according claim 1, wherein an entirety of the face of the bus bar which opposes the external terminal is flat.

12. An electric storage device, comprising:
an electric storage element including an external terminal; and
a bus bar connected to the external terminal, a face of the bus bar, which opposes the external terminal, being flat,
wherein the bus bar has a substantially rectangular shape in a plan view and includes a main body portion and a connection portion, the connection portion being connected to the external terminal,
wherein a thin-walled portion is formed at a center portion in a width direction of the connection portion,
wherein a thick-walled portion of the connection portion is formed inside the thin-walled portion such that the thin-walled portion is located around outer edges of the thick-walled portion,
wherein the thin-walled portion and the external terminal are directly welded together,
wherein the thin-walled portion is formed in a stepped shape and a thickness of the thin-walled portion is less than a thickness of a remaining portion of the bus bar including the thick-walled portion, and
wherein the thin-walled portion has a circular shape that encircles the thick-walled portion.

13. The electric storage device according to claim 1, wherein the bus bar further includes another thick-walled portion located around outer edges of the thin-walled portion, the thickness of the thin-walled portion being less than a thickness of said another thick-walled portion.

* * * * *